United States Patent

Locati et al.

[15] 3,641,751
[45] Feb. 15, 1972

[54] SIDE-SHARPENABLE CUTTER STRUCTURES

[72] Inventors: Norman C. Locati, Lake Oswego; John Leslie Edgerton, Canby, both of Oreg.

[73] Assignee: Omark Industries, Inc., Portland, Oreg.

[22] Filed: Jan. 16, 1970

[21] Appl. No.: 4,466

Related U.S. Application Data

[63] Continuation of Ser. No. 705,738, Feb. 15, 1968, abandoned.

[52] U.S. Cl. .................................................. 56/291, 56/292
[51] Int. Cl. ............................................................ A01d 55/24
[58] Field of Search ................................. 56/290–292, 244, 56/245, 289

[56] References Cited

UNITED STATES PATENTS

| | | | |
|---|---|---|---|
| 2,481,364 | 9/1949 | Strong | 260/558 |
| 2,744,376 | 5/1956 | Miner | 56/244 |
| 3,043,079 | 7/1962 | Aston | 56/290 |
| 3,106,053 | 10/1963 | Fairbairn | 56/291 |
| 3,133,398 | 5/1964 | Tatum | 56/17.5 |

*Primary Examiner*—Robert Peshock
*Assistant Examiner*—J. A. Oliff
*Attorney*—Buckhorn, Blore, Klarquist and Sparkman

[57] ABSTRACT

Endless V-belts mounted on swathers or mowers carry side-sharpenable cutters secured to the belts. One cutter includes a body having a tang projecting through a slot in the V-belt and locked thereto by a transverse roll pin with angular, oppositely extending, transverse feet portions of the body engaging the outer face of the belt, an offsetting portion extending outwardly from the belt, a shank portion transverse to the offsetting portion, and an inclined cutter plate which has a side surface which can be ground to sharpen a cutting edge thereon. The cutter plate has an angularly positioned outer edge portion. In another cutter, the mounting plate extends completely through the V-belt and a roll pin and an arcuate washer secure the mounting plate to the V-belt. Another cutter includes an angular body portion, an offsetting portion and a shank portion forming a "U". The shank portion carries an inclined side cutter, and a staple extends through the body, the belt and an arcuate washer to secure the cutter to the belt. An inclined side plate is secured to a shank carried by a body portion joining the shank and the foot.

20 Claims, 8 Drawing Figures

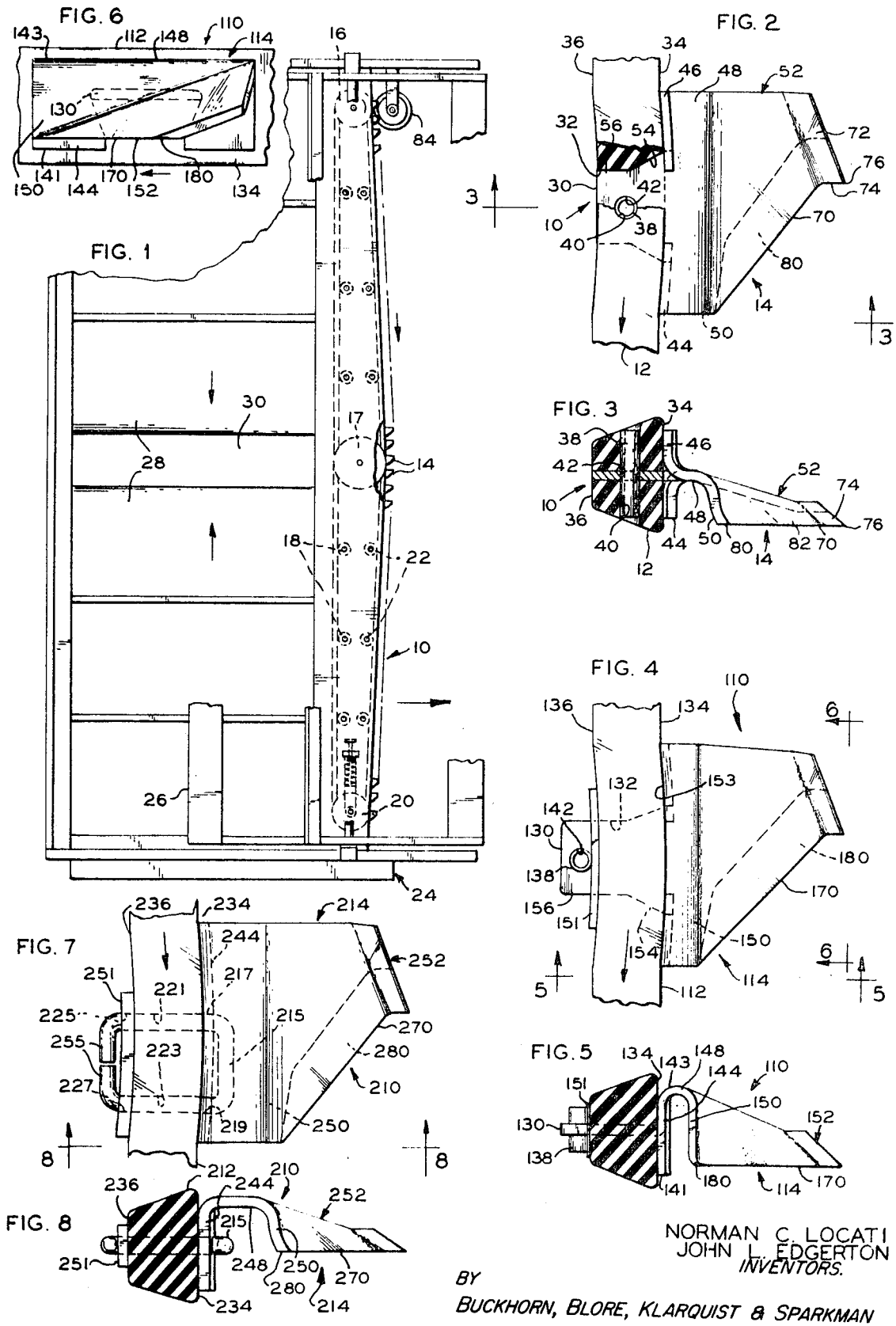

SIDE-SHARPENABLE CUTTER STRUCTURES

This application is a continuation of application Ser. No. 705,738, filed Feb. 15, 1968, and now abandoned.

This invention relates to improved side-sharpenable cutter structures, and more particularly to improved vegetation-cutting systems.

Cutting systems including side-sharpenable cutters carried by an endless belt are disclosed and claimed in copending application Ser. No. 664,054, filed Aug. 29, 1967 by Myron D. Tupper and assigned to the same assignee as this patent. Such cutters may be quickly and easily sharpened by moving an abrasive sharpening member into engagement with forward, side edge surfaces of inclined side cutter plates while the belt advances the cutters past the sharpener. Such cutting systems work very well. However, it would be desirable to provide structures for attaching the cutters to the belts which would have longer useful lives and which are less expensive than those disclosed in said application.

An object of the invention is to provide new and improved side-sharpenable cutter structures.

Another object of the invention is to provide new and improved vegetation-cutting systems.

A further object is to provide new and improved structures for attaching cutters to endless belts.

Another object of the invention is to provide sheet metal vegetation cutters having tangs extending from bodies through endless belts and secured to the belts by roll pins.

Another object of the invention is to provide improved vegetation-cutting assemblies including endless belts and cutters having curved bodies engaging the outer faces of the belts and permitting flexing of the belts as the belts are advanced around pulleys.

A further object of the invention is to provide an improved vegetation cutter assembly including an endless belt with a sheet metal cutter having a tang punched from a body and extending through the belt and secured to the belt by a curved washer and a pin.

The invention provides improved, side-sharpenable cutter structures, each including an endless belt to which sheet metal cutters are secured, each cutter including a tang projecting from a body into a slot in the belt and secured to the belt by a pin. Each cutter also includes an inclined side plate having a side-sharpenable surface and carried by the body.

A complete understanding of the invention may be obtained from the following detailed description of improved cutter structures forming specific embodiments thereof, when read in conjunction with the appended drawings, in which:

FIG. 1 is a fragmentary, top plan view of a swather which includes an improved side-sharpenable cutter structure forming one embodiment of the invention;

FIG. 2 is a fragmentary, enlarged, top plan view of the cutter structure of FIG. 1;

FIG. 3 is a vertical sectional view taken along line 3—3 of FIG. 2;

FIG. 4 is a fragmentary, top plan view of an improved side-sharpenable cutter structure forming an alternate embodiment of the invention;

FIG. 5 is a vertical sectional view taken along line 5—5 of FIG. 4;

FIG. 6 is an enlarged side elevation view taken along line 6—6 of FIG. 4;

FIG. 7 is a fragmentary top plan view of an improved side-sharpenable cutter structure forming an alternate embodiment of the invention; and FIG. 8 is a vertical sectional view taken along line 8—8 of FIG. 7.

Referring now in detail to the drawings, an improved side-sharpenable cutter structure 10 (FIGS. 1, 2 and 3) forming one embodiment of the invention includes an endless, reinforced, rubber or rubberlike V-belt 12 carrying cutters 14, and driven along an endless path by a grooved drive roller 16 and guided by grooved guide pulleys 18, 20 and 22. The pulleys form a portion of a swather 24 which includes a driven reel 26 which lays cut vegetation back on slatted belts 28. The belts deliver the cut vegetation to a discharge opening to form a windrow on the ground as the swather is advanced through the field.

Each cutter 14 is of one piece formed from sheet metal, and has a tang or mounting plate 30 fitting closely in a slot 32 extending from an outer face 34 of the V-belt 12 to an inner face 36 thereof. A roll pin 38 fits closely in and extends through a hole 40 in the V-belt and a hole 42 in the tang to securely fasten the cutter to the belt. The roll pin is slit longitudinally and is of spring metal so that, while it normally holds itself in the hole 42, the roll pin can be compressed laterally by pliers or the like and withdrawn from the holes 40 and 42 for replacement of the cutter 14. Planar feet or body portions 44 and 46 of the cutter 14 are bent to project from opposite sides of an offsetting portion 48 of a shank 50 which mounts an inclined side plate 52. The feet are inclined somewhat relative to each other as best shown in FIG. 2 so as to lie along chords of an arc and, in effect, form a concave or arcuate mounting plate adapted to provide clearance for the V-belt to permit the V-belt to flex and conform to each of the pulleys 16, 17, 18, 20 and 22 as it travels around these pulleys. The tang 30 has a tapered portion 54 and a narrower end portion 56 and the slot 32 is substantially complementary in shape to the shank. The feet 44 and 46 are of substantially the same length and width. The foot 44, the offsetting portion 48 and the shank 50 form essentially a "U" as viewed in FIG. 3, and the foot 46, the offsetting portion 48 and the shank 50 form essentially a "Z" as viewed in FIG. 3.

The side plate 52 is inclined upwardly and rearwardly relative to the horizontal plane of the centerline of the V-belt 12 and has a cutting edge 70 inclined rearwardly and outwardly relative to the belt at an angle preferably of not greater than 60° to the adjacent portion of the belt so that a slicing action is imparted, the belt preferably being driven at least 3,000 feet per minute so that the cutters have an impact-cutting effect. The slicing action reduces the power necessary to provide the impacting-cutting. The side plate is tilted rearwardly and upwardly relative to the direction of advancement at an angle of preferably not substantially less than 40° relative to the horizontal and not substantially greater than 55° to the horizontal. This provides longevity to the cutting edge, permits many sharpenings and a good, quite acute cutting edge. In addition to this rearward and upward inclination, the side plate also is tilted downwardly slightly relative to the plane of the centerline of the V-belt to provide the sweptback cutting edge 70. The side plate is planar except that outer edge portion 72 is bent somewhat upwardly to cause trailing end portion 74 of the cutting edge to be slightly hooked and corner 76 to keep pointed. That is, the trailing end portion 74 is substantially at right angles to the adjacent portion of the belt and this minimized rounding of the point 76.

The cutting edge 70 is defined by a sharpening surface 80, which is the lower, forward end or edge of the side plate 52, and leading or forward face 82 of the side plate. The surface 80 preferably is in a horizontal plane and is abraded when desired by bringing up an abrasive annular sharpening member 84 (FIG. 1) into engagement with the surface 80 as the V-belt 12 is advanced around the drive pulley 16. The sharpening member 84 abrades the surfaces 80 to sharpen the cutting edges 70 of the cutters 14, and sharpens all the cutters to the same extent so that the edges 70 lie in the same plane. As indicated above, the surfaces 80 and the abrading face of the member 84 are preferably horizontal. However, if desired the member 84 can be tilted to cause the surfaces 80 to be tilted relative to the horizontal.

The feet 44 and 46 provide a stable support on the V-belt 12 for the cutters 14 and the positions of the feet form a concave configuration, which, with only the roll pin 38 restraining the inner portion of the V-belt, permit the belt to flex easily to a curved configuration. This permits the belt to smoothly conform to the pulleys, thereby providing smooth travel of the belt which is essential to the high operating speed of the belt which may be from 3,000 to greater than 10,000 feet per minute.

EMBODIMENT OF FIGS. 4 TO 6

An improved side-sharpenable cutter structure 110 forming an alternate embodiment of the invention includes an endless V-belt 112 carrying side-sharpenable cutters 114, and is similar to the cutter structure 10 except as brought out hereinafter. Each cutter 114, as are the cutters 14, is formed entirely from a blank of sheet metal. Each cutter 114 has a concave foot or body 144 from which a tapered portion 154 of a tang 130 is cut and bent to a substantially perpendicular position relative thereto. The tang has a narrower end portion 156 which extends inwardly beyond inner face 136 of the V-belt. A roll pin 138 extends through and is compressed in a hole 142 in the tang and bears against an arcuate, slotted washer 151 concentric to inner face 153 of the foot 144 to tension the shank and hold the face 153 tightly against outer face 134 of the V-belt. The tang fits closely in a slot 132 in the V-belt. This permits the V-belt to flex freely and conform to the pulleys (not shown) on which it is mounted, the pulleys, of course, having deep V-grooves to provide clearance for the ends of the tangs, the roll pins and the washers, the grooves being of such a width as to just substantially fully receive the V-belt. The tang 130 is substantially equidistant from lateral edges 141 and 143 (FIGS. 5 and 6) of the foot 144. A side plate 152 having a cutting edge 170 and a sharpening surface 180 is identical to the side plate 52 and is carried by a shank 150 joined to the foot 144 by an offsetting portion 148 forming a portion of the shank. The shank 150 and the foot 144 form a "U" in transverse cross section.

EMBODIMENT OF FIGS. 7 AND 8

A side-sharpenable cutter structure 210 forming an alternate embodiment of the invention includes a V-belt 212 carrying cutters 214 spaced therealong. The cutters 214 are like the cutters 14 and 114 except that the cutters 214 have no tabs and are secured to the V-belt 212 by staples 215 extending through holes 217 and 219 respectively in the central and forward portions of an arcuate foot or body 244, holes 221 and 223 in the V-belt and holes 225 and 227 in an arcuate washer 251. Each staple 215 has bent over end portions 255 engaging the washer 251 and pulling the foot 244 tightly against outer face 234 of the V-belt and pressing the washer 251 tightly against inner face 236 of the V-belt. The washer 251 is of a length just over one-half the length of the foot 244 and is coextensive only with about the forward half of the foot 244. Each cutter 214 includes a side plate 252 identical with the side plates 52 and 152 and secured to the foot by a shank 250 having an offsetting portion 248. The side plate 252 has a horizontal lower, forward edge sharpening surface 280 and a sweptback cutting edge 270.

The above-described cutters, because of their angular geometry, are connected to the V-belts in such a fashion as to provide rigidity, speed and uniformity of sharpening. The cutters provide maximum flexibility of the belt without causing belt failure or fatigue. With the above cutter structures, sharpening can be effected without interrupting the cutting operation of the mowers or swathers.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an improved cutter structure,
   an endless belt having slots therein extending inwardly from the outer face of the belt and also extending along the belt parallel to the pitchline of the belt,
   a plurality of cutter means having platelike tang means fitting into the slots, body means disposed angularly relative to the tang means and in face-to-face engagement with the outer face of the belt and cutter plates carried by the body means in positions sloping relative to the direction of movement and having substantially horizontally extending planar-sharpenable end surfaces parallel to said direction of movement,
   and securing means holding the tang means in the slots in the belt with the body means engaging said face of the belt,
   the cutter structure having no obstructions forwardly or rearwardly of the sharpenable end surfaces so that the end surfaces can be sharpened by moving them in said direction of movement past a planar abrasive member.

2. The cutter structure of claim 1 wherein the tang means are tangs having transverse holes therethrough, the belt has holes aligned with the holes in the tangs and the securing means are pins.

3. The cutter structure of claim 2 wherein each of said pins comprises a roll pin.

4. The cutter structure of claim 1 wherein the tang means extend completely through and beyond the belt and the securing means are positioned in engagement with the inner face of the belt.

5. The cutter structure of claim 4 wherein portions of the tang means extending beyond the belt have holes therethrough and the securing means comprises pins extending through the holes.

6. The cutter structure of claim 5 wherein the securing means includes washers positioned between the pins and the belt.

7. The cutter structure of claim 4 wherein the securing means includes washers positioned on the tang means and engaging the belt and fastening means secured to the tang means and pressing the washers against the belt.

8. The cutter structure of claim 7 wherein the fastening means comprises pins extending through holes in the tang means.

9. The cutter structure of claim 1 wherein the securing means and tang means includes a staple clamping the body means to the belt.

10. The cutter structure of claim 9 wherein the staple is positioned longitudinally offcenter of the body means.

11. The cutter structure of claim 9 including an arcuate washer shorter than the body means and adapted to be engaged by the staple.

12. The cutter structure of claim 11 wherein the staple and the washer are positioned closer to the front end of the body means than to the rear end thereof.

13. The cutter structure of claim 1 wherein the tang means comprises a tang of sheet metal cut from one portion of the body means and bent to extend substantially perpendicularly from the body means into the belt.

14. The cutter structure of claim 13 wherein the body means includes a pair of feet extending in opposite directions.

15. The cutter structure of claim 13 wherein the tang is joined to the central portion of the body means.

16. The cutter structure of claim 13 wherein the body means includes a pair of feet extending in the same direction.

17. The cutter structure of claim 13 wherein the body means is arcuate and of a predetermined length.

18. The cutter structure of claim 17 including an arcuate washer of a length substantially less than that of the body means, and said securing means connecting the tang and the washer.

19. The cutter structure of claim 17 wherein the securing means includes a roll pin extending through a hole in the tang.

20. The cutter structure of claim 19 wherein the securing means includes an arcuate washer positioned between the roll pin and the belt.

* * * * *